R. M. WARWICK.
BAG TYING MACHINE.
APPLICATION FILED FEB. 7, 1917.

1,289,980.

Patented Dec. 31, 1918.

Witnesses:
Robert H. Weir
Arthur W. Carloss

Inventor:
Rogers M. Warwick
By Rudolph M. Lotty Atty.

UNITED STATES PATENT OFFICE.

ROGERS M. WARWICK, OF CHICAGO, ILLINOIS, ASSIGNOR TO GENERAL WIRE TIE CO., OF CHICAGO, ILLINOIS, A CORPORATION OF ILLINOIS.

BAG-TYING MACHINE.

1,289,980.

Specification of Letters Patent. Patented Dec. 31, 1918.

Application filed February 7, 1917. Serial No. 147,081.

*To all whom it may concern:*

Be it known that I, ROGERS M. WARWICK, citizen of the United States, residing at Chicago, in the county of Cook and State of Illinois, have invented certain new and useful Improvements in Bag-Tying Machines; and I do hereby declare the following to be a full, clear, and exact description of the invention, such as will enable others skilled in the art to which it appertains to make and use the same.

This invention relates to improvements in bag tying machines, and more particularly to machines for tying the mouths of valved bags with wire to prepare them for filling by a bag-filling machine.

The present invention further relates to improvements in and about machines for tying bags with wire described and claimed in the following pending applications for patents, namely: Rogers M. Warwick, bag tying machine, filed June 13, 1914, Ser. No. 844,894; Rogers M. Warwick, bag tying machine, filed Feb. 23, 1915, Ser. No. 9962; Warwick and Nessling, feed devices, etc., filed Apr. 19, 1915, Ser. No. 22,374; Edwin V. Nessling, bag tying machine, filed Apr. 19, 1915; Ser. No. 22,395; Rogers M. Warwick, bag tying machine, filed July 12, 1915, Ser. No. 39,515.

The particular object of the present invention is to provide a bag-tying machine including a carrier for the bags to be tied in which the carrier is automatically positioned to present the bag to be tied to the coöperative mechanism for tying the same in a positive manner without undue strain or jar on the mechanism.

Another object of the invention is to provide mechanism for positioning the carriage at intervals to present the bag to be tied to means for throwing the tied bag positively out of the carrier at a predetermined point in the movement thereof.

Another object of the invention is to provide a carrier and bag-tying mechanism including means for rendering the tying mechanism inactive unless the carrier contains a bag to be presented to the tying mechanism as the bag reaches that point in the travel of the carrier at which the tying operation is performed.

A further object of the invention is to provide as a part of the tying mechanism, means for insuring the engagement of one end of the wire tie in a part of the tying mechanism preparatory to completing the tie for insuring the imparting of the proper tension to the wire preparatory to the completion of the tie.

Another object of the invention is to provide a carrier for bags to be tied including bag-mouth puckering mechanism comprising elements acting at different intervals to insure the puckering of the bag being performed without placing undue strain on such puckering mechanism.

The objects of the invention will be fully understood from the following specification:

The invention consists in the features of construction and combinations of parts hereinafter fully described and claimed.

In the accompanying drawings illustrating suitable embodiments of the invention:

Figure —1— is a top plan view of a bag-tying machine constructed in accordance with the invention.

Fig. —2— is a fragmentary top plan view of the carrier constituting a part of the machine, the top plate thereof being removed for rendering visible portions of the mechanism beneath the same.

Fig. —3— is a view similar to Fig. —2— showing the carrier in a different position.

Fig. —4— is a central vertical longitudinal section on the line 4—4 of Fig. —2—.

Fig. —5— is a central vertical transverse section on the line 5—5 of Fig. —1—.

Fig. —6— is a detail perspective view of a stop member constituting a part of the carrier-controlling mechanism.

Fig. —7— is a detail top plan view of the rotatable member constituting the main portion of the carrier.

Fig. —8— is a fragmentary detail perspective view of one of the wire guides disposed on the carrier around the bag-mouth-receiving recesses of the latter.

Fig. —9— is a fragmentary detail plan section through one of the wire guides of the carrier.

Fig. —10— is a fragmentary detail vertical longitudinal section through the wire-guiding and tying-head of the machine.

Fig. —11— is a fragmentary detail top plan view of the rotatable member of the tying head.

Fig. —12— is a fragmentary detail view in end elevation of the tying head and the portion receiving the same, shown in Fig. —10—.

Fig. —13— is a fragmentary detail top plan view of the bag-carrier of the machine showing the same equipped with supplementary bag-puckering mechanism.

Fig. —14— is a fragmentary detail vertical section on the line 14—14 of Fig. —13—.

Fig. —15— is a fragmentary detail plan section of a portion of the tying mechanism showing the means for effecting engagement of the end of the wire for forming the tie with the tying or twisting head preparatory to closing the tie.

Fig. —16— is a fragmentary detail vertical longitudinal section through the wire-feeding portion of the machine and showing a part of the carrier illustrating mechanism for rendering the wire-feeding mechanism inactive in the event that no bag is carried by the carrier for presentation to said wire-feeding mechanism.

Fig. —17— is a fragmentary detail vertical transverse section on the line 17—17 of Fig. —16—.

Fig. —18— is a top plan view showing the wire tie produced by the machine.

Fig. 19 is an end elevation of the wire guide shown in Fig. 8.

In the drawings I have illustrated several embodiments of certain parts of the invention which differ from each other in certain details which, however, fall within the scope of the invention as defined in the appended claims.

The machine comprises one part which includes mechanism for feeding wire forward from a reel or other source, engaging one end thereof after it has been passed around the puckered mouth of the bag, then retracting the wire so as to place it under tension, thereafter twisting the first-named end and the body of the wire about each other to form a closed loop, and then cutting the tie from the body of the wire and forming a key at the closure of the loop for enabling the same to be readily opened when it is desired to open the bag. This said portion of the machine also includes mechanism for holding the wire-feeding mechanism out of action or actuating relation to the wire.

The other part of the machine comprises a rotatable carrier provided with a plurality of recesses for receiving the puckered mouths of the bags; means for feeding the bags successively into said recesses; means associated with each recess and coacting successively with the wire-feeding mechanism of the first-named portion of the machine for passing the end of the wire around the puckered mouths of the bags; means coacting with the mechanism for throwing the wire-feeding mechanism out of actuating relation to the wire; and mechanism for throwing the tied bags out of the carrier.

The two parts of the machine are associated to operate in synchronism, the first-named portion of the machine actuating the carrier at proper intervals to rotate the same through a given arc whereby to successively present the bag-receiving recesses to the wire-feeding mechanism for effecting the passage of the wire successively around the puckered mouths of the bags.

Machines of this character are obviously subjected to great wear especially when used for tying valved Portland cement bags, and the like, which are used repeatedly, and which carry a great deal of the finely pulverized cement which obviously becomes loosened during handling of the bags, and becomes deposited upon the machine. This dust gets into the bearings and into the operating mechanisms and upon the wearing surfaces generally, and grinds them away quite rapidly. Accordingly, it has been found difficult to produce a machine which will resist becoming substantially inoperative in a comparatively short time. The present machine has been designed and constructed particularly with a view to giving it long life by avoiding the employment of parts of such delicacy as to be easily affected to prevent successful operation by the said cement dust, and the like, to the wearing action of which the same is subjected. This has included reduction of the number of operative parts of the machine, and the employment of parts of such character as may be worn away to a considerable extent without interfering with the successful operation of the machine.

Figure 12:
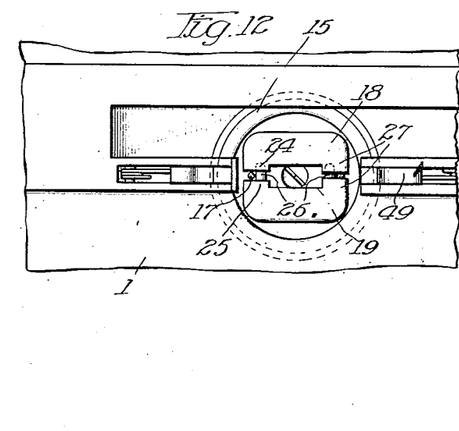

The first-named portion of the machine comprises a suitably supported top plate 1 containing bearings for the vertical shafts 2 and 3 carrying the spur gears 4 and 5 respectively. The spur gear 5 meshes with a spur pinion 6 on a drive-shaft 7 and is constantly rotated by the latter. The bearing for the shaft 2 is mounted in a carriage 8 slidable in suitable guides 9 mounted on the top plate 1 and in a direction toward and from the shaft 3 of the gear 5, and normally held by a spring or springs to maintain said gears 4 and 5 in mesh. The said gears 4 and 5 contain arcuate or segmental wire-engaging members 10 having opposed knurled or otherwise treated faces between which wire fed from a coil through guide tubes 11 and 12 is adapted to be engaged for feeding a given length of such wire forward during each rotation of said gears 4 and 5. The said wire passes from the tube 12 into the tube 13 mounted in one end of a member 14 extending diametrically of a hollow rotatable head or sleeve 15 with which it is integral, and which is provided with a longitudinal guide opening 16 for the wire extending from a point at the rear end of said head 15 in the axis thereof at an incline to terminate at one side of such axis, as indicated at 17 in Fig. —12—. Pivotally mounted within said head 15 on opposite sides of said member 14 are two levers or vise-jaws 18 and 19. The pivots for the latter are disposed substantially midway between the ends thereof, and each thereof is provided at its rear end with what might be termed a cam member 20 which is adapted to be engaged by the wedge-shaped end portion 21 of a reciprocable plunger 22 to turn said levers on their pivots simultaneously against the action of the helical compression spring 23 to cause the other ends or heads 24 and 25 of said levers 18 and 19 to approach each other. The said heads 24 and 25 are provided respectively at points on diametrically opposite sides of the axis of rotation of said head with recesses, and with projections 26 adapted to enter said recesses. It will also be seen by reference to Fig. —12— that the opposed portions of said heads 24 and 25 are of different dimensions, so that the parts 27 at one side of said head approach each other more closely than those at the opposite side. The said portions 27 at the right-hand side of Fig. —12— constitute vise jaws for engaging the end of the wire fed through the said head therebetween, the portion of the wire passing between the other portions 27 of the heads remaining at all times free to be moved longitudinally therebetween.

The reciprocable member 22 carries an annularly grooved head 28 in which projections in the bifurcated end of a lever 29 engage, the latter being actuated by a groove-cam mounted upon the upper face of the gear 5 for imparting reciprocable motion to said plunger 22 at proper intervals to effect engagement of the wire between the portions 27 of the heads 24 and 25, and then to release the same. The lever 29 is pivotally secured at one end to a projection 30 on the plate 1, which also constitutes the pivot for the lever 31 mounted between its ends thereon, and carrying a projection 32, also engaging in the groove of a cam on the lower face of the gear 5 for actuating another part of the mechanism, as will be hereinafter more fully described.

The mechanism heretofore described is substantially identical with that shown and described in my copending application Ser. No. 39,515 with the exception of the portions 27 of the heads 24 and 25 which are somewhat differently constructed to act in a slightly different manner than heretofore to engage the wire, and which eliminates the splitting of one of the heads into two parts actuated at different intervals to engage said wire, this being, however, a comparatively important change for reasons hereinbefore set forth in effecting a reduction of the number of parts and wearing surfaces included in the machine.

Figure 1:
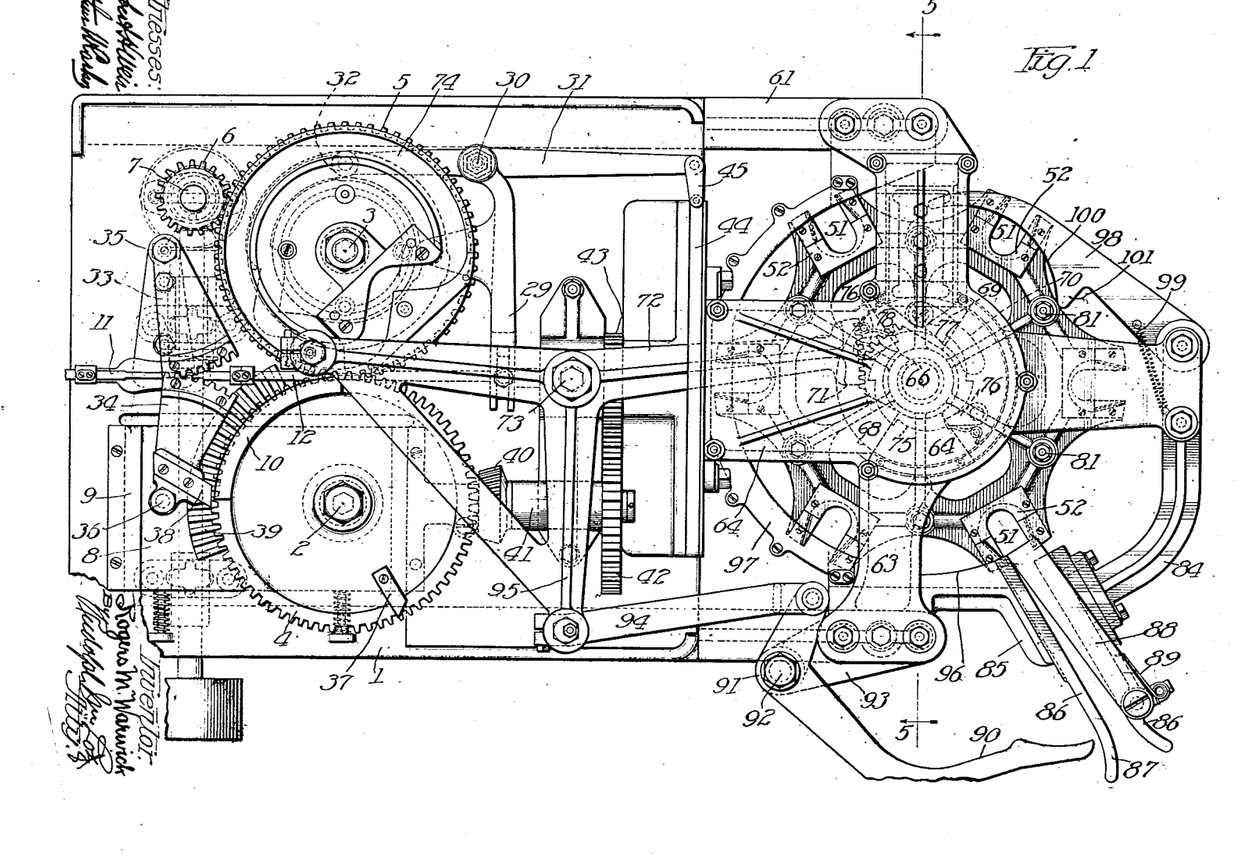

When the head 28 is moved forward it throws the beveled faces 21 of the plunger 22 to project between the partition member 14 and the ends of the levers 18 and 19, thus moving the wire-engaging heads 24 and 25 of said levers toward each other against the action of the spring 23. The wire which has been previously fed through the tube 13 and through a wire guide, hereinafter described, around the puckered mouth of the bag at the free end of said wire is thus clamped between the right-hand members 27. The body portion of the wire which passes between the heads of the levers 18 and 19, as it leaves the guide opening 16 is not engaged, but is maintained free. This permits the body portion of the wire to be retracted by means of the wire-retracting mechanism consisting of two intermeshing segmental gears 33 and 34. The segmental gear 33 is pivotally mounted on a stud 35 on the plate 1, and the gear 34 on a stud 36 mounted upon the sliding member or carriage 8 which carries the stud 2 on which the gear 4 is mounted. The said gears 33 and 34 also carry segmental wire-engaging elements between which the wire passes from the tube 11 into the tube 12, the latter being separated from each other by a free space into which the said wire-engaging surfaces of the said members project. As the wire is moved forward by engagement of the members 10 of the gears 4 and 5 therewith during rotation of the latter, the said gears 33 and 34 are moved to the position shown in Fig. —1—. They remain in this position until the projection 37 on the gear 4 strikes the projection 38 on the gear 34, thus rocking the latter and the gear 33 to draw back or retract a part of the wire which has been previously fed forward by the wire-engaging segments 10 which are out of engagement with the wire at the time this retracting operation takes place.

As soon as the said retracting members have made their stroke, and before the wire has a chance to return from its retracted position by the tendency of the puckered mouth of the bag to expand the loop of wire now very tightly drawn about the mouth of the bag, the said loop is tied by the mechanism which I will now describe.

The gear 4 carries a bevel-gear segment 39 which meshes with a bevel pinion 40 on a horizontal shaft mounted in a bearing 41 suitably secured to the plate 1. Rigid with said shaft is a spur-gear 42 which meshes with a spur pinion 43 which is rigid with the sleeve 15 carrying the vise jaws 18 and 19, and the mechanism for opening and closing the same. From the relative positions of the said bevel segment 39 and the projection 37 it will be seen that the retracting operation is completed at just about the instant that the said segment 39 meshes with the bevel pinion 40 and starts the rotation of the sleeve 14 and vise jaws 18 and 19, whereby to twist the engaged end portion of the wire loop and body portion disposed opposite to same about each other to tie the loop. This gearing is so arranged that the sleeve 15 is given two or three complete revolutions and will always return the vise jaws to exactly the right position for the next operation.

Figure 15:
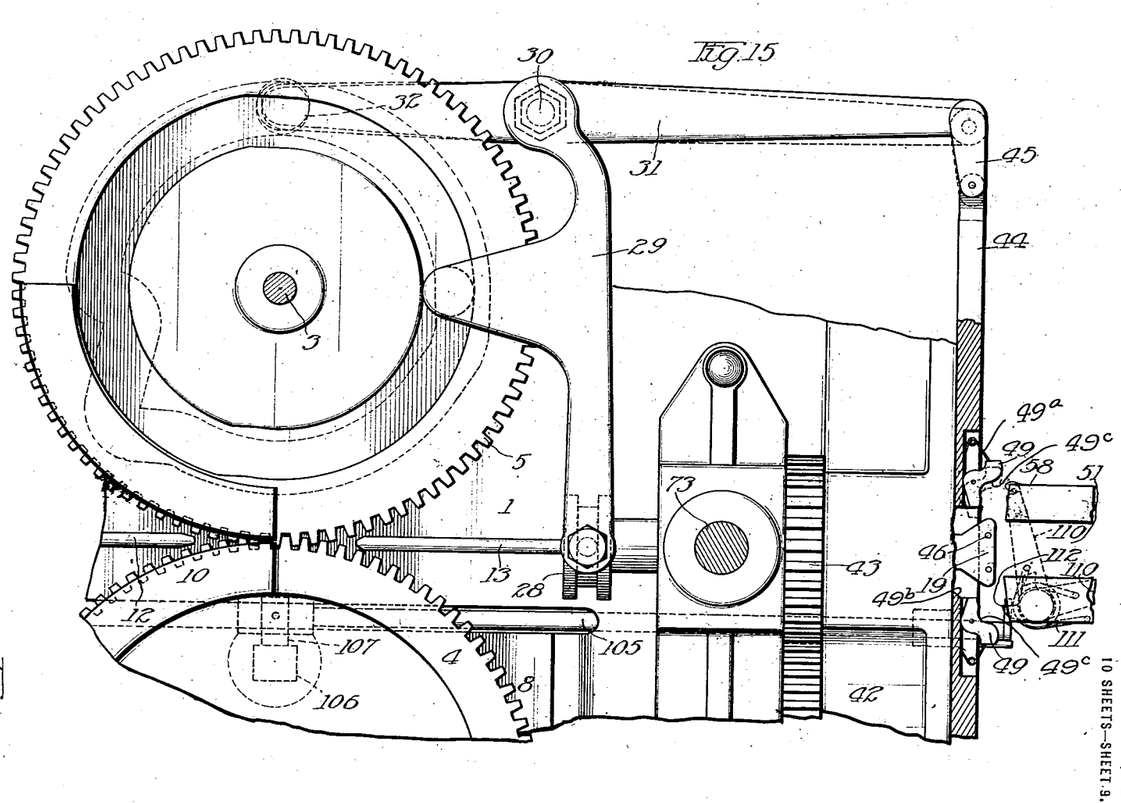
Figure 18:
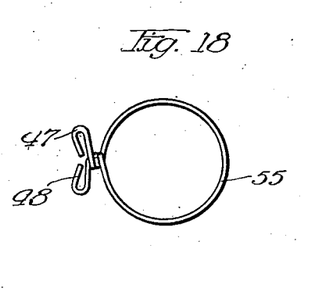

As soon as the said loop has been tied by twisting the end portions of same about each other the next operation consists in cutting the wire and forming a key for manually opening or untwisting the tie; the said key being clearly shown in Fig. —18—. The wire-cutting mechanism includes the lever 31 actuated by the cam groove in the lower face of the gear 5 and the laterally reciprocable plunger 44 connected with one end of the lever 31 by means of the line 45. The said plunger is moved laterally at different intervals. As soon as the wire has been fed forward by the segments 10 on the gears 4 and 5 the extreme end portion of the wire is disposed in the path of a part of said plunger 44, and is moved by the latter laterally into engaging relation to the wire-engaging members 27 of the vise jaws 18 and 19 just as the latter close so as to insure engagement thereof. The plunger then moves back to its normal position and remains there until the twisting operation has been completed, whereupon it again moves laterally so as to bend the said extreme end portion projecting from between the engaging members 27 toward the forward end of the sleeve 15 around the projection 46, thus forming the small loop 47, as shown in Fig. —18—. During the stroke of the plunger 44 in this direction the other end portion of the loop is still integral with the body of the wire, but as the plunger 44 moves back it makes a longer stroke than in the first-named direction to accomplish two functions. The first is to shear the wire at the mouth of the opening 16; this being accomplished by means of a knife carried by the plunger 44, and the next operation consisting in bending the wire to form the loop 48 shown in Fig. —18—. After accomplishing the second stroke the plunger agains moves slightly in the first-named direction to its normal position, remaining there until it again makes the very slight reciprocable stroke to again throw the first-named end of the next succeeding loop into engaging relation to the heads 27. The mechanism for forming the loops 47 and 48 consisting of the spring-held pivoted members 49 carried by the plunger 44 is the same as has been heretofore disclosed in my copending application Ser. No. 9,962 filed the 23d day of February, 1915. The only novel feature disclosed in the present application, so far as the said plunger 44 is concerned, is the making of the initial reciprocable stroke for throwing or tucking the end portion of the wire loop into engaging relation with the members 27. The plunger 44 carries the two elements 49 which are similar to the bell-crank levers and are held normally in the position shown in Fig. —15— by means of springs $49^a$ in an obvious manner. The inner opposed ends of said elements 49 are adapted to pass between the jaws 18 and 19 successively as the plunger 44 is reciprocated in respectively opposite directions. Said plunger is provided with an opening through which the heads 18 and 19 project and at one side of said opening is a cutting edge $49^b$. After the loop has been tied about the object the plunger 44 moves to the right from the position shown in Fig. —15— thereby causing the end portion of the wire disposed in the path of the left-hand element 49 to be bent about the pin 46, and this bending is continued until the concave elbow portion $49^c$ of the element 49 comes in contact with the portion of the wire which has been bent about said pin 49. The stroke of the plunger continues so that from this time on the said element 49 is turned on its pivot against the action of the spring $49^a$, thus bending the end of the wire completely around the said pin 46. During this period the element 49 at the right-hand side is inactive, but as the plunger now makes its return stroke the knife edge $49^b$ first cuts the wire and thereupon the operation of bending the wire about the other of the pins 46 of the head 19 is accomplished in the same manner as in the preceding stroke at the left-hand side. After this has been accomplished the plunger 44 returns to the position shown in full lines in Fig. —15— and remains there until the next loop has been tied, whereupon the operation is completed.

Relative to the cam groove controlling the levers 29 and 31 it will be noted that in Fig. —15— these are shown to be in opposite faces of the gear 5 and that the shape of the upper cam groove is entirely different from that shown in Fig. —1—. The cam groove 74 is in a disk which is rigid with, but mounted above the gear 5, and is separated from the same by a free space into which the projection on the lever 29 extends.

Figure 8:
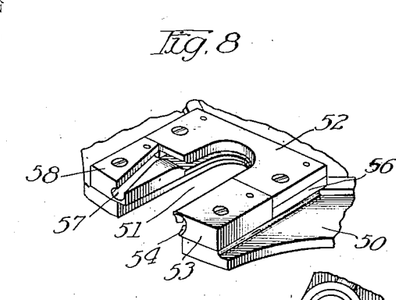
Figures 9, 19:
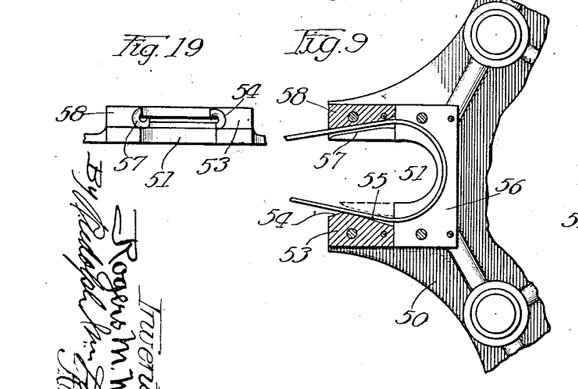
Figure 10:
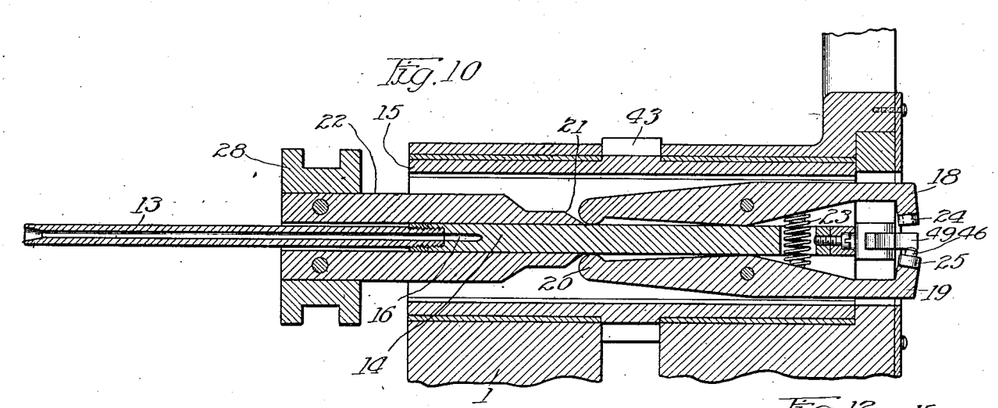
Figure 11:
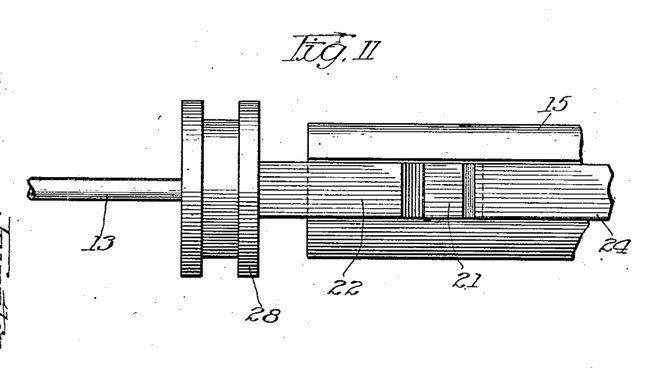

The bags to be tied are successively presented to the wire-feeding mechanism by the rotatable carrier 50 which is provided with a plurality of recesses 51 in which the puckered mouths of the bags are received, and each of which is bordered by the substantially horse-shoe shaped wire guide 52, the latter being shown in detail in Figs. —8— and —9—. Each of the wire guides comprises a plurality of plates mounted on the carrier 50 and rigidly secured thereto by means of set screws and dowel pins. The plate 53 initially receives the projecting end of the wire, and is provided in its vertical face bordering the recess 51 with a tapered mouth 54 leading into a guide groove 55 which extends at a slight angle to the straight wall of the recess 51. The inner end of this guide-groove 55 communicates with the substantially semi-circular guide-groove in the plate 56 which consists of two parts, one of which is mounted upon the other, one of said plates being provided with a recess which is covered by the other thereof to complete the groove. The end of the wire as it passes into the groove of said plate 56 is bent to substantially the semi-circular form shown in Fig. —9— and passes then into the guide-groove 57 of the plate 58 disposed opposite the plate 53 and constituting the delivery end of the loop-forming device from which the free end of the wire is projected for engagement between the members 27 and the vise jaws. It will be noted that the groove 57 of the plate 58 is open at the top, the groove itself constituting substantially three-quarters of a complete cylinder. The purpose of this is to insure the passage of the end of the wire straight toward the members 27 and the vise jaws; it being obvious that the curvature imparted to the wire in the groove of the plate 56 is such as to tend to throw the said end of the wire farther inwardly and substantially into the recess 51. It will also be noted that the direction of rotation of the sleeve 15 and vise jaws 18 and 19 is such that as soon as the tying operation takes place this end portion of the wire lying within the groove 57 will be thrown out of said groove so as to leave the tie free to be withdrawn from the recess when completed.

Figure 2:
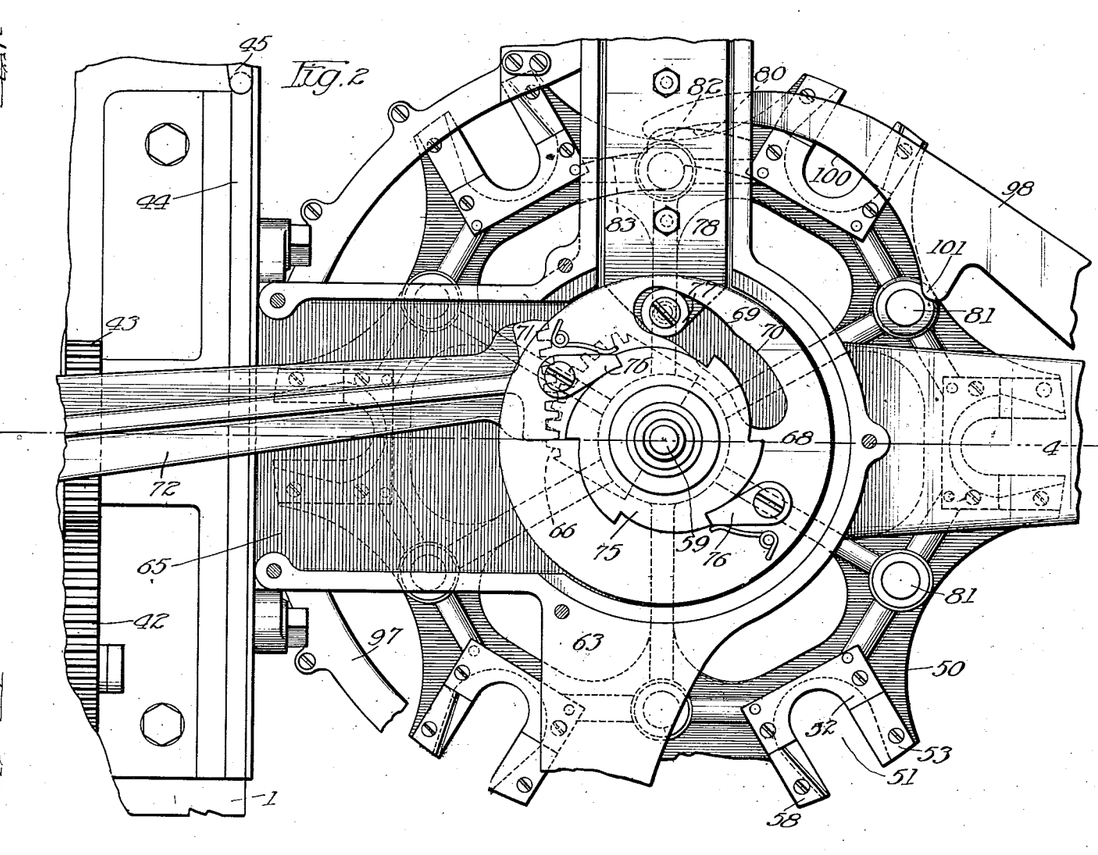
Figure 3:
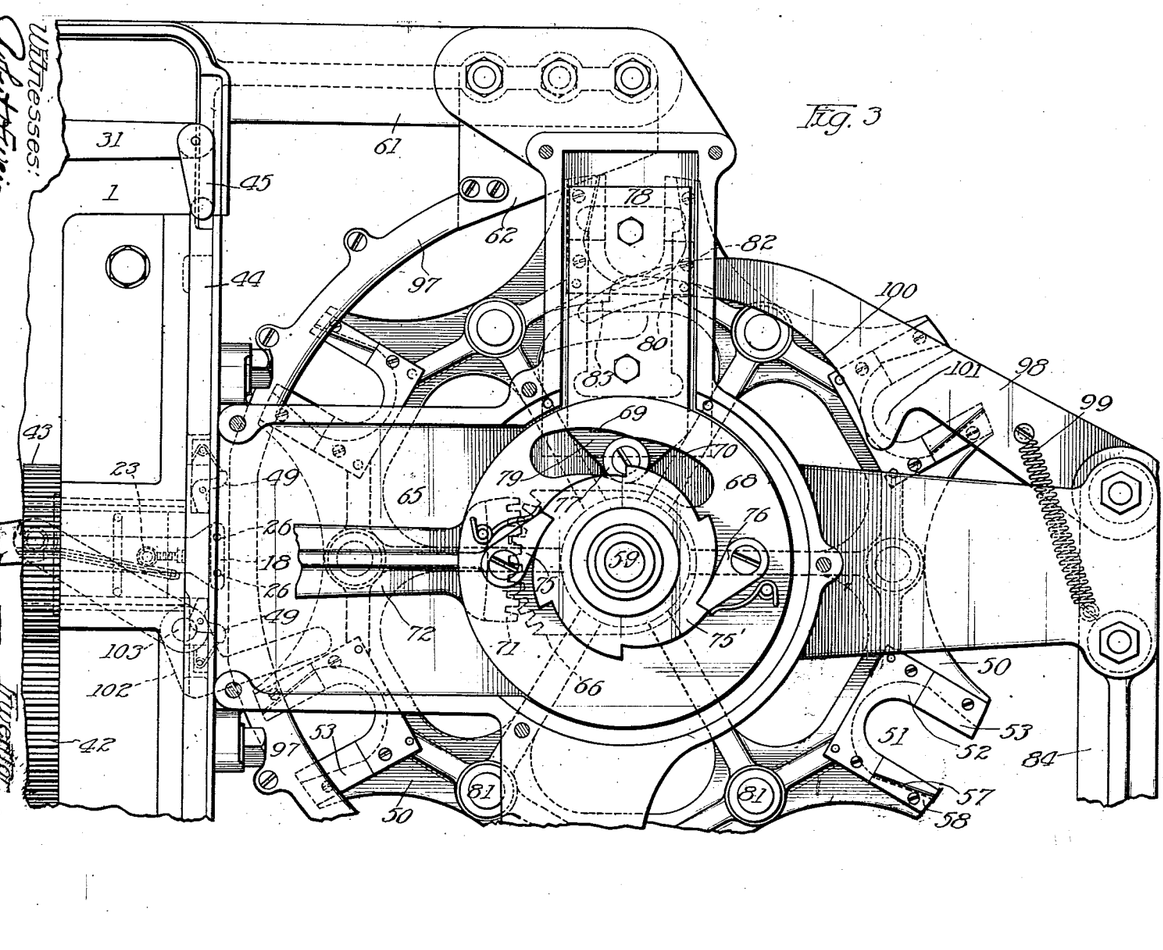
Figure 4:
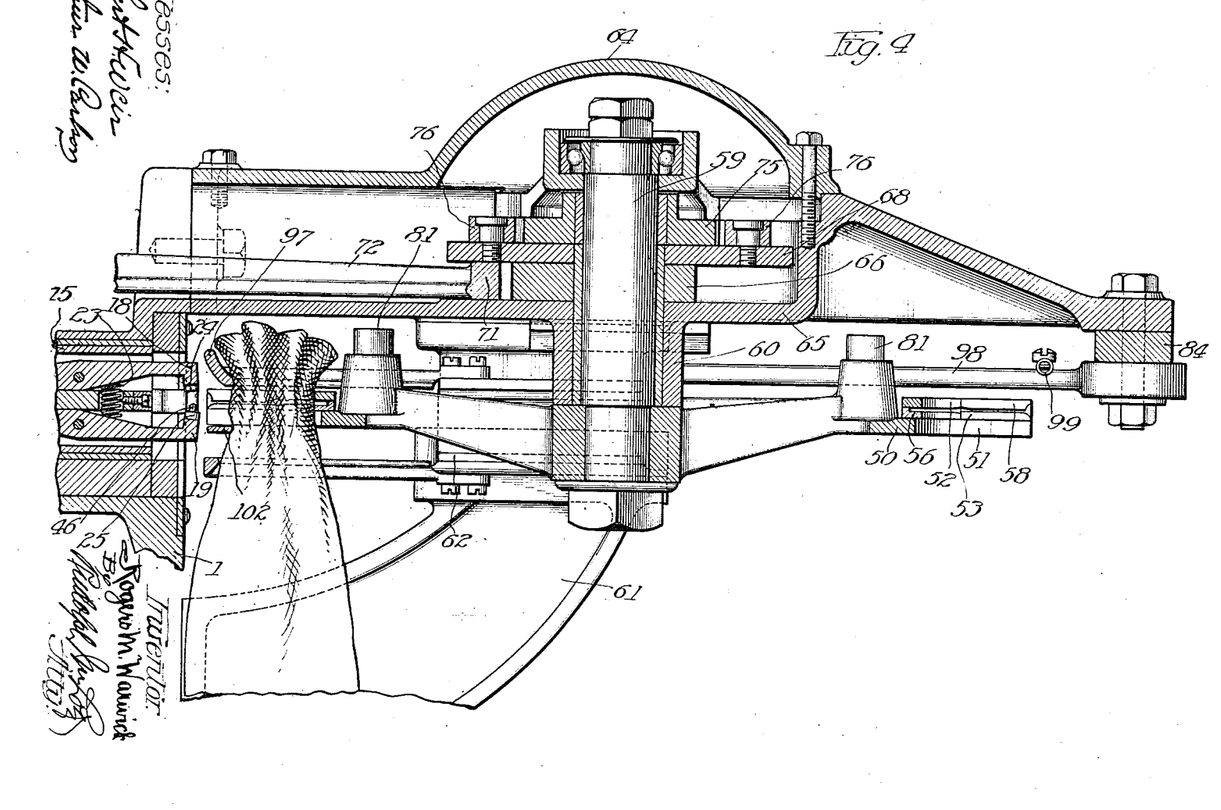

The bag-carrier 50 is rigidly mounted upon the lower end of the shaft 59 rotatable in a bearing 60 carried by the rigid portion of the frame. The latter comprises the bracket 61 upon which the end portions of a cross-head 62 are secured. The latter in turn carry the member 63 with which the bearing 60 is integral. Said member comprises a casting which includes the portion 64 mounted upon a portion of the main or body portion of the machine which carries the wire-feeding mechanism. The said member 63 is so formed as to provide an annular horizontal flange 65 at the upper end of the bearing 60 upon which the spur pinion 66 is supported. The latter is keyed by means of the pins 67 to be rigid with a disk 68 which is provided with a slot comprising two arcuate portions 69 and 70 respectively, communicating with each other and which are disposed so that the outer end portion of the slot 69 is farther removed from the axis of rotation of said disk than the inner portion thereof which communicates with the outer end portion of the slot 70. The latter is arcuate and concentric with the axis of the disk. The said spur pinion 66 and disk 68 are rotatable relatively to the shaft 59, and are adapted to be rocked at regular intervals by means of the segmental rack 71 mounted at the outer end of a rocking lever 72 pivotally mounted between its ends on a pin 73 and which is provided at one end with an anti-friction roller engaging in the cam groove 74 in the upper face of a disk 74ª rigid with the gear 5 and disposed above the same so as to provide a free space therebelow into which the projection on the lever 29 extends. The gear 66 is also merely a segmental gear, as clearly shown in Figs. —1—, —2— and —3—.

Rigid with the shaft 59 and disposed above the disk 68 is a ratchet wheel 75 having a number of teeth corresponding exactly with the number of bag-mouth-receiving recesses 51 of the carrier. The disk 68 carries two spring-held pawls 76 engaging the ratchet 75 at diametrically opposite points simultaneously so that upon each rocking movement of the lever 72 the said shaft will be rotated through an arc equal to the arcuate separation of successive recesses 51.

Figures 5, 6:
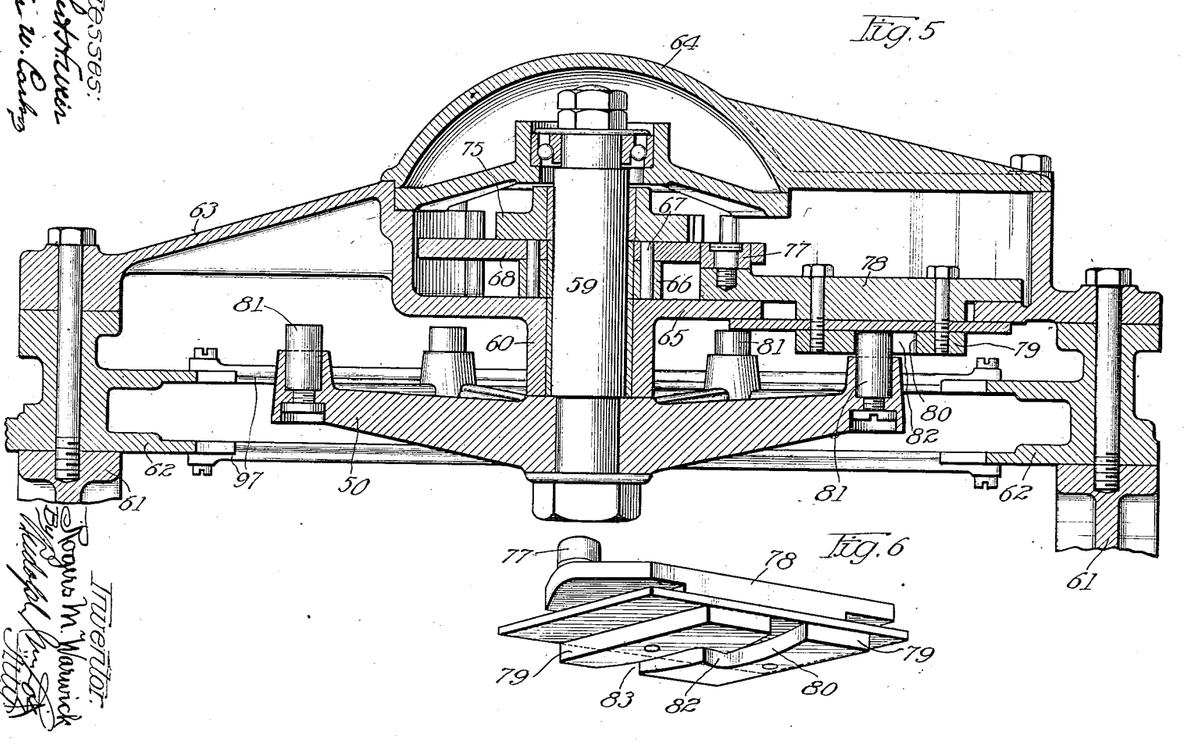
Figure 7:
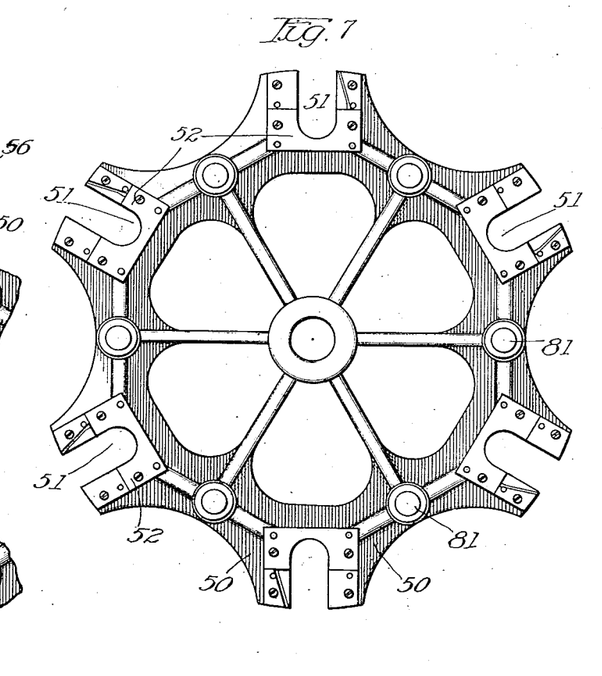

The slots 69 and 70 together constitute a cam slot in which the anti-friction roller 77 at one end of the reciprocable plunger 78 engages, said slot being adapted to impart reciprocable movement to said plunger for purposes of alternately locking and disengaging the carrier 50 and holding it firmly in position between the intervals of movement thereof so that the wire guides will properly register with the wire-feeding mechanism for coöperation therewith to form the tie around the mouth of the bag. The said plunger 78 carries a cam member 79, shown in detail in Fig. —6—, consisting of two plates between which a stepped groove 80 is formed. In this groove the projections 81 mounted on the carrier 50 and alternating with the recesses 51 are adapted to engage. As said plunger 78 is disposed at one limit of its movement one end of the stepped groove is disposed in the path of and is adapted to receive one of the projections 81 which is permitted to move to the point between the ends of the said stepped groove and abut against the wall 82 which is substantially radially disposed relatively to the axis of the carrier. In Fig. —2— the groove 80 is shown in dotted lines in position to receive one of the projections 81, one of the latter being shown as engaged therein. The disk 68 is now positioned to begin its return movement or inactive stroke to cause the pawls 76 to spring past and engage two teeth of the ratchet 75, and during this retractive movement the plunger 78 is drawn radially inwardly to the position shown in Fig. —3— whereupon the projection 81 now engaged in the groove 80 enters the outermost portion 83 of said groove. This is accomplished during the first substantially one-half of the retractive movement of the disk 68, and during the remainder of said retractive movement the plunger 78 is held in the position indicated by the engagement of the anti-friction roller in the concentric portion 70 of the slot in said disk 68. During this interval the carrier 50 remains immovable but upon completion of the said retractive stroke the disk 68 begins its active stroke to turn the ratchet 75 and carrier 50. During the period or arc of movement during which the anti-friction roller 77 remains engaged in the concentric portion of the slot 70 of the disk, the projection 81 engaged in the groove 80 of the cam 79 will pass out of the outermost portion of the said groove 80. During the balance of the active stroke of the disk 68 the anti-friction roller 77 will be engaged in the portion 69 of the cam slot in said disk, and will move the plunger 78 outwardly again so as to cause the inner portion of the groove 80 to become disposed in the path of the next succeeding projection 81 which passes into said groove, occupying the position midway between the ends thereof and against the shoulder 82. The carrier is thus positively prevented from rotating beyond the desired point, and is accordingly positively held in position by the coaction of the said shoulder and the teeth of the ratchet 75; thus holding the wire guides successively in exactly the proper position to receive the projected end of the wire for forming the ties.

The machine also includes means for introducing mouths of the bags successively into the recesses 51, at the same time puckering them therein and preventing the same from leaving said recesses. The carrier frame includes two members 84 and 85 carrying the plates 86 bordering the slot 87 in which the mouth portion of the bag is received; the same being manually inserted in said slot. Said slot extends radially relatively to the carrier and is so positioned that the recesses 51 successively become disposed to register with the delivery end of said slot. Pivotally mounted on one of the arms 86 is an arm 88, the inner end of which is normally held in contact with the inner end of the other arm 86 by means of the spring 89; thus partially covering the slot 87 but being moved against the action of said spring 89 by the insertion of the mouth of a bag into said slot. The mouth of the bag becomes engaged between the inner end of said arm and the first-named plate 86, but is immediately fed into the recess 51 registering with said slot by means of the puckering arm 90 of a lever 91 pivotally mounted upon a pin 92 carried by a projection 93 on one of the brackets 61 and which is connected at its other end by means of the link 94 with a lateral arm 95 integral with the lever 72. The bag-engaging end of the arm 90 of said lever 91 is normally positioned as shown in Fig. —1— so as not to project into or over the slot 87 so as not to interfere with the manual insertion of the mouth portion of the bag into the latter. Said arm is rocked at regular intervals so that the bag-engaging end thereof describes an arc intersecting the slot 87, thus engaging the mouth portion of the bag disposed in the path thereof and forcing the same into the recess 51 registering with the slot 87 and at the same time puckering said mouth while crowding it into said recess. When this has been accomplished the arm 88 springs back to the position shown in Fig. —1—, and constitutes the equivalent of a valve for preventing the puckered mouth of the bag from expanding so as to project from the recess 51. The inner end of said arm 88 is concentric in its normal position with the axis of rotation of the carrier 50 and is flush with the inner arcuate face 96 of a retaining member 97 disposed concentric with the axis of the carrier 50 and which projects slightly inwardly of the mouths of the recesses 51 therein. The said member 97 describes an arc of substantially one hundred and eighty degrees and retains the puckered mouths of the bags in place within the recesses 51 from the time that they are inserted into said recesses until after they have been tied and are ready to be delivered at a given point in the movement of the carrier wherein such bags, when delivered, will not interfere with the operation of any portion of the mechanism of the carrier. This point is preferably beyond the end of the left-hand bracket 61 supporting the carrier-frame, and, to insure the bags being delivered at the proper point I also provide means for forcibly throwing such bags out of said recesses. Said means comprise the arm 98 pivotally mounted at one end upon a portion of the frame of the carrier, and which projects at its other end over the carrier 50; being normally held in the position shown in Fig. —3— by means of the helical tension spring 99. The free end of said arm 98 is curved inwardly so as to present an arcuate convex surface for engagement by the puckered mouth of the bag at the point in the latter nearest the axis of rotation of the carrier, and at a point in the movement of the latter substantially ninety degrees removed from the point at which the bag is tied. The inner face of the lever constitutes an arcuate cam 100 terminating substantially midway between the ends of said arm in a projection 101 presenting a lateral or transverse shoulder. The said arcuate cam surface 100 is disposed in the path successively of the projections 81 which engage the same and turn the lever or arm 98 against the action of the spring 99 so that the outer arcuate surface of said arm passes just beyond the mouths of the recesses thus obviously throwing the puckered mouths of the bags out of the latter. As each of the projections 81 successively passes the projection 101 of said arm 98 the latter will spring back to the position shown in Fig. —3—, so that its outer arcuate surface will be disposed in the path of the next succeeding bag carried in a recess 51.

It is also obviously desirable to avoid the feeding of wire to form a tie as the recesses 51 become successively presented to the wire-feeding mechanism unless such recesses contain puckered mouths of the bags to be tied, as otherwise there would be a very considerable waste of wire. Accordingly, I have provided means for throwing the wire-feeding mechanism out of engaging relation to the wire in the event that a recess 51 should approach the tying mechanism empty of the puckered mouth of a bag to be tied.

As shown in Fig. —3—, one means for accomplishing the last-named purpose comprises the lever 102 pivotally secured between its ends to a stud 103 projecting from the bottom of the machine-frame, and the other end of which is pivotally connected with a lever 104 which is pivotally secured at its other end to the bottom of the plate 1 and carries a cam which engages a part of the carriage 8 to hold the latter normally positioned so as to throw the wire-engaging elements 10 of the gears 4 and 5, and the similar elements of the plates 33 and 34 out of engaging relation to the wire without, however, causing the teeth of the gears 4 and 5 and plates 33 and 34 to pass out of mesh with each other. The construction of said lever and cam and its mode of operation is fully described and claimed in the application for Letters Patent of E. V. Nessling, Ser. No. 22,395, filed the 19th day of April, 1915. It will be noted that the lever 102 is normally positioned in the path of the mouth portion of the bag below the recessed portions 51 of the carrier so that as each of the recesses 51 containing a bag passes the lever 102 the latter will be turned by engagement with the bag to throw the lever 104 over so as to let the carriage 5 assume the position in which the wire-engaging parts of the machine are thrown into engaging relation to the wire to be fed, but in the event that one of said recesses does not carry a bag the wire-engaging elements will remain out of engaging relation to the wire until a recess 51 carrying a bag is presented opposite the wire-projecting elements of the machine.

Figure 16:
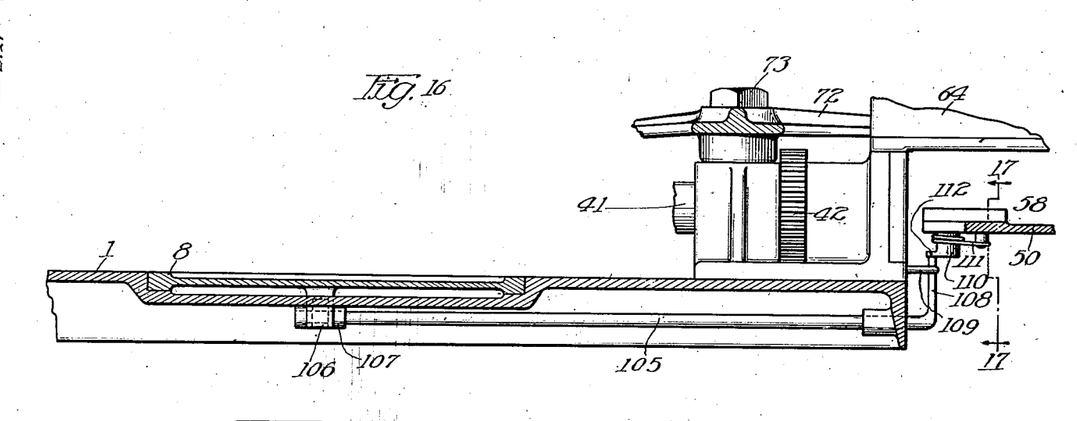
Figure 17:
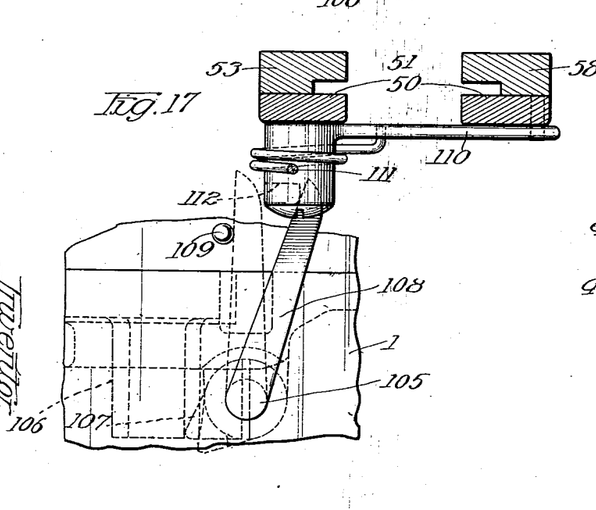

In Figs. —15— to —17— inclusive, I have illustrated mechanism for accomplishing the same purpose. This comprises a rock-shaft 105 rotatable in bearings at the front of the machine-frame and at a point opposite the carriage 8 on the lower face of the plate 1. The plate 8 is provided with a projection 106 which is adapted to be engaged by the cam 107 on the shaft 105 which is shown more clearly in dotted lines in Fig. —17—, and is adapted to normally maintain the wire-engaging elements out of engaging relation to the wire, and to throw the same into such engaging relation whenever a recess 51 containing the puckered mouth of a bag is presented. At the forward end of the shaft 105 is an arm 108 which is normally maintained in contact with a stop projection 109 on the machine-frame.

Pivotally mounted on the lower face of the carrier 50 at one side of the mouth of each of the recesses 51 is a lever 110 which is maintained by a spring 111 normally in the position indicated in dotted lines in Fig. —15—, so as to span the mouth of the recess 51. The said lever 110 is provided with a projection 112 which, when the lever 110 is turned to the position shown in full lines in Fig. —15— (which would result from the insertion of the puckered mouth of the bag into the recess 51) would hold said lever 110 in said position. The said projection 112 is then positioned to engage the arm 108 to rock the shaft 105, and thus permit the carriage 8 to move to the position in which the wire-engaging elements of the machine are disposed in engaging relation to the wire to be fed; said shaft being held in such position until the mouth of the bag has been tied and the carrier makes a further movement whereupon the shaft 105 and the arm 108 will spring back to the normal position determined by the stop 109.

Figure 13:
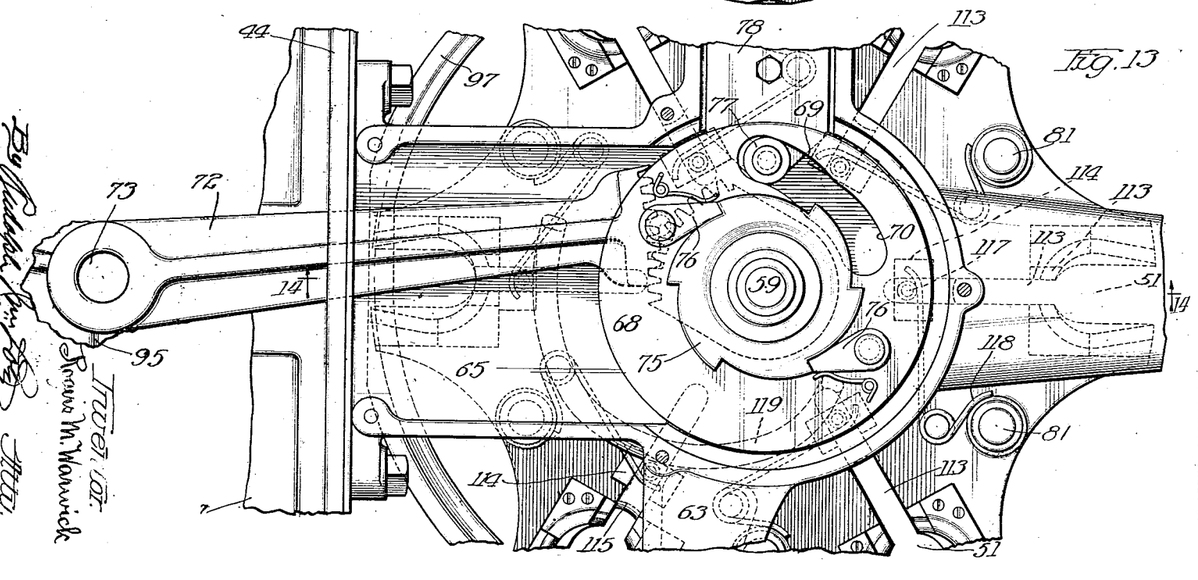
Figure 14:
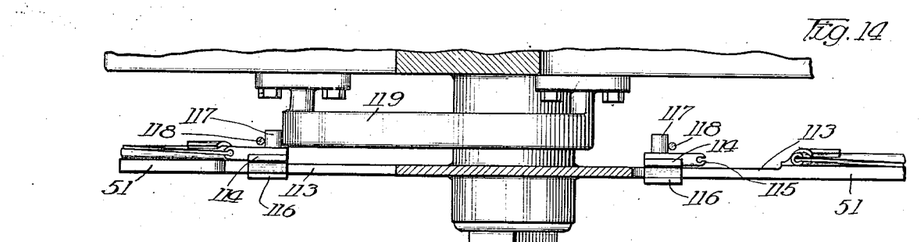

In Figs. —13— and —14— I have illustrated another embodiment of a part of the invention which consists in providing means for enlarging the recesses 51 so as to provide more room for the initial insertion of the mouth of the bag within the said recesses, and subsequently effecting the final puckering, under sufficient pressure, during the travel of the carriage to effect proper closure preparatory to applying the tie. To this end each of the recesses 51 terminates in a radial slot 113 in which a plunger 114 is reciprocably movable; said plunger containing a portion 115 of the wire-guide groove of the plate 56 of which said plunger constitutes a part. Each plunger is provided with suitable guide flanges 116 and is equipped with a projection 117 engaged by a spring 118 for holding said plunger normally at the inner limit of its movement at the inner end of the radial slot 113.

While thus positioned the bag is inserted in the recess 51 and into the slot 113 and, as it moves from said position, the projection 117 is engaged with an eccentric cam 119, shown in Fig. —13—, for gradually moving the plunger 114 radially outwardly thereby obviously forcing the portion of the bag contained in the slot 113 into the recess 51. When the plunger 114 is disposed at the outer limit of its movement the portion thereof containing the wire guide groove will register with the guide groove of the plate 56, and will be held in this position during the tying operation, as clearly shown in dotted lines in Fig. —13—. Shortly after the tying has been completed the plunger 114 will pass beyond the end of the cam 119, and will spring back to the rearward limit of its movement where it will remain until it attains the position to receive the next bag, whereupon it will be again moved outwardly as above described.

I claim as my invention:

1. In a machine of the kind specified, the combination with mechanism for forming a loop of wire about an object to be tied and means for twisting the end portions of the loop about each other, the latter including means for engaging one end of the looped wire, of means for moving the said end of said wire into engaging relation to the said engaging means.

2. In a machine of the kind specified, the combination with mechanism for feeding wire longitudinally to cause the same to pass around an object to be tied to form an open loop about said object, of means for twisting the ends of said loop about each other including clamping means for engaging the forward end of the wire constituting one end of the loop, and means adapted to engage said end of the wire to throw the same into engaging relation to said clamping means.

3. In a machine of the kind specified, the combination with mechanism for feeding wire longitudinally to cause the same to pass around an object to be tied to form an open loop about said object, of means for twisting the ends of said loop about each other including clamping means for engaging the forward end of the wire constituting one end of the loop, and means adapted to engage said end of the wire to move the same laterally into engaging relation to said clamping means.

4. In a machine of the kind specified, the combination with mechanism for feeding wire longitudinally to cause the same to pass around an object to be tied to form an open loop about said object, of means for twisting the ends of said loop about each other including clamping means for engaging the forward end of the wire constituting one end of the loop, and a reciprocable element adapted to engage said end of the wire to throw the same into engaging relation to said clamping means.

5. In a machine of the kind specified, the combination with mechanism for feeding wire longitudinally to cause the same to pass around an object to be tied to form an open loop about said object, of means for twisting the ends of said loop about each other including clamping means for engaging the forward end of the wire constituting one end of the loop, and a reciprocable element adapted to engage said end of the wire to throw the same into engaging relation to said clamping means at the instant of closure of the latter.

6. In a machine of the kind specified, the combination with mechanism for feeding wire longitudinally to cause the same to pass around an object to be tied to form an open loop about said object, of means for twisting the ends of said loop about each other including clamping means for engaging the forward end of the wire constituting one end of the loop, and a reciprocable element adapted to engage said end of the wire to laterally move the same into engaging relation to said clamping means at the instant of closure of the latter.

7. In a machine of the kind specified, the combination with mechanism for feeding wire longitudinally, a carrier for objects to be tied, and object-engaging elements on said carrier each including a member having a groove adapted to receive the wire and cause the same to form an open loop about the object, a portion of said groove having its mouth portion disposed to prevent ready passage of the wire out of the same, means for retracting a portion of the wire fed for contracting the said loop about the object and withdrawing the wire from the said groove, of mechanism for tying the looped wire and simultaneously disengaging the same from said looping means.

8. In a machine of the kind specified, the combination with mechanism for feeding wire longitudinally, of a wire-guide having a groove through which the wire is adapted to be forced to form an open loop, the greater portion of said groove opening toward the center and in the plane of said loop, and a portion thereof open substantially perpendicularly to the plane of the loop, and tying mechanism including means engaging one end portion of the looped wire and adapted to lift the wire out of the last-named portion of said groove.

9. In a machine of the kind specified, the combination with mechanism for feeding wire longitudinally, of a wire-guide having a groove through which the wire is adapted to be forced to form an open loop, the greater portion of said groove opening toward the center and in the plane of said loop, and a portion thereof open substantially perpendicularly to the plane of the loop, tying mechanism including means engaging one end portion of the looped wire and adapted to lift the wire out of the last-named portion of said groove, and wire-retracting mechanism coacting with said wire-engaging means for withdrawing the wire of the loop from the remaining portion of said groove.

10. In a machine of the kind specified, the combination with mechanism for passing a loop of wire about an object and tying said loop, an object-carrier for presenting objects successively to said first-named mechanism, said carrier equipped with a plurality of equally spaced object-engaging elements, and mechanism for imparting intermittent movement to said carrier for positioning said object-engaging elements successively with respect to said loop and tying mechanism, said means including a reciprocable stop element having a stepped groove including an intermediate portion extending in the direction of reciprocation thereof, projections on said carrier movable in a fixed path and adapted to enter one end portion of said stepped groove and engaging in the intermediate portion of said groove between the intervals of movement of said carrier, means for moving said stop element during the last-named interval to bring the other end portion of said groove into the path of travel of said projections to permit the passage thereof out of the same, and thereafter during a part of the movement of said carrier returning said stop element to its first-named position.

11. In a machine of the kind specified, the combination with mechanism for passing a loop of wire about an object and tying said loop, an object-carrier for presenting objects successively to said first-named mechanism, said carrier equipped with a plurality of equally spaced object-engaging elements, and mechanism for imparting intermittent movement to said carrier for positioning said object-engaging elements successively with respect to said loop and tying mechanism, an object ejecting element associated with the carrier, a reciprocable stop-element on the carrier-frame, and projections on the carrier adapted to be successively engaged by said stop element to hold the carrier against movement, said projections adapted to successively engage said object-ejecting element to release objects engaged in the object-engaging elements of the carrier.

12. In a machine of the kind specified, a carrier equipped with a plurality of object-engaging recesses each including an element for effecting the passage of wire about the engaged object, a part of said element reciprocably movable in a slot communicating with said recess for enlarging the latter, and means for returning said part to normal position during travel of the carrier for moving the object or any part thereof from said slot into said recess.

13. In a machine of the kind specified, a carrier equipped with a plurality of object-engaging recesses each including a guide for looping wire about the engaged object, a part of said guide reciprocably movable in a slot communicating with said recess, and constituting an extension of the latter adapted to receive a portion of the mouth of a bag or similar object, an element effecting closure of the mouth of said recess after the object is received therein, and means for returning the said reciprocable part to normal position to crowd the object into said recess while the mouth of the latter remains closed.

14. In a machine of the kind specified, an object carrier equipped with a plurality of object-receiving recesses, mechanism associated with said carrier for successively passing loops of wire about the objects, means normally maintaining said mechanism inoperative to perform said function, and means associated with said recesses and adapted to be moved and held by the contained object in engaging relation to said first-named means for throwing the same out of its normal position whereby to render said mechanism operative to perform its function as each object-containing recess attains a predetermined position with relation to said mechanism.

15. In a machine of the kind specified, an object carrier equipped with a plurality of object-receiving recesses, mechanism associated with said carrier for successively passing loops of wire about the objects, a spring-held element normally maintaining said mechanism inoperative to perform its function, and a lever normally spanning the mouth of each recess of said carrier and adapted to be turned and held out of said normal position as the object to be tied enters such recess, whereby said lever is turned to position to operatively engage and move said element against the action of said spring to throw said mechanism into functioning position as each object-containing recess is presented to said mechanism for tying the contained object.

In testimony whereof I have signed my name in presence of two subscribing witnesses.

ROGERS M. WARWICK.

Witnesses:
M. M. BOYLE,
G. T. KHINALLAS.